FI-9311 OF RE 16,735
173
Sept. 13, 1927.
R. V. KAIMER
Re. 16,735
LATCH FOR VEHICLE DOORS
Original Filed Feb. 5, 1925
2 Sheets-Sheet 1
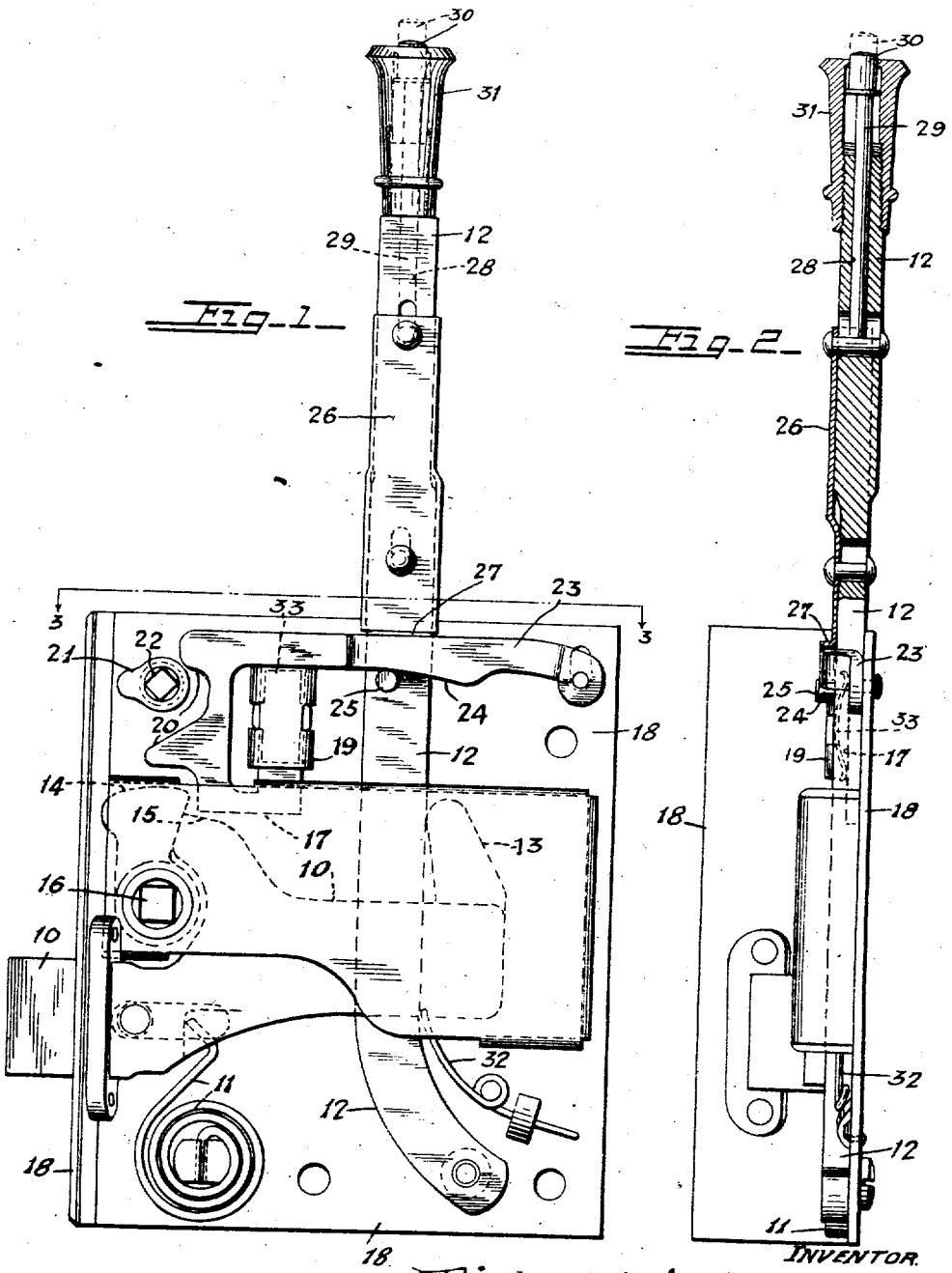
INVENTOR.
Richard V. Kaimer.
By George Bayard Jones Atty 173
Sept. 13, 1927.
R. V. KAIMER
Re. 16,735
LATCH FOR VEHICLE DOORS
Original Filed Feb. 5, 1925 2 Sheets-Sheet 2
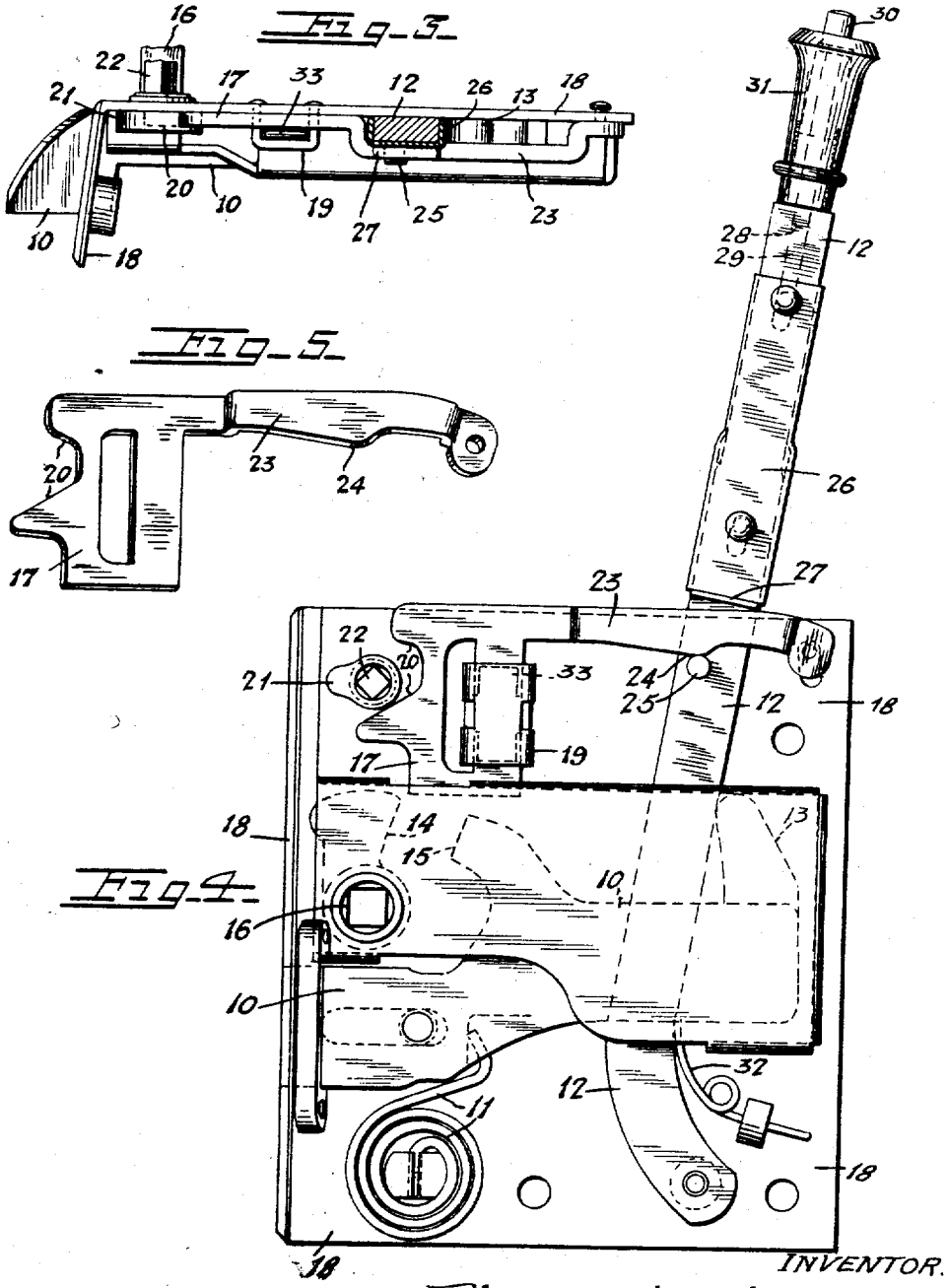
INVENTOR.
Richard V. Kaimer,
George Bryan Jones, Atty.

173

Reissued Sept. 13, 1927. Re. 16,735

UNITED STATES PATENT OFFICE.

RICHARD V. KAIMER, OF NEW HAVEN, CONNECTICUT, ASSIGNOR TO THE ENGLISH & MERSICK CO., OF NEW HAVEN, CONNECTICUT, A CORPORATION.

LATCH FOR VEHICLE DOORS.

Original No. 1,551,032, dated August 25, 1925, Serial No. 6,923, filed February 5, 1925. Application for reissue filed July 22, 1927. Serial No. 207,801.

Fig. 1 is a plan view of a latch for vehicle doors constructed in accordance with my invention, and shown in the locked position.

Fig. 2 an edge view of the same, with the operating lever partly in section.

Fig. 3 a sectional view on the line 3—3 of Fig. 1.

Fig. 4 a plan view with the latch-bolt in its retired position.

Fig. 5 a perspective view of the locking slide, detached.

This invention relates to improvements in latches for vehicle doors, and particularly to latches which are provided with means whereby the latch-bolt may be locked in its thrown position, so that the door cannot be opened from the outside without a key. The object of the invention is to provide a simple arrangement of vehicle door latches in which the latch-bolt may be positively locked in its thrown position, and means mounted in the latch-operating lever for moving the latch-locking mechanism into position, and the invention consists in the construction as hereinafter described and particularly recited in the claims.

In carrying out my invention, I employ a latch-bolt 10, adapted to be thrown forward by a spring 11 and retired by means of a lever 12 acting against a projection 13 at the rear of the bolt, or by means of a handle roll-back 14 co-acting with a projection 15 near the forward end of the bolt, this roll-back 14 being adapted to be turned by the usual handle arranged outside the door and provided with a spindle 16 fitting the hub of the roll-back for turning it. Above the roll-back and adapted to be moved downwardly in the rear thereof is a locking-slide 17, mounted on a case-plate 18 and guided for vertical movement by a guide 19. This locking-slide is formed with a cam-surface 20 projecting into the path of a cam 21 and mounted on a key-operated spindle 22 of usual construction. The arm 23 of the locking-slide is formed in its under-side with a a cam 24, to be engaged by a stud 25 on the lever 12. The rear end of said arm 23 has a pin or rivet $23^a$ secured thereto which passes through an opening or slot $23^b$ in the case-plate with an enlarged head $23^c$ on the outside of said case-plate whereby said end is secured to said case-plate without interfering with the necessary movement of said arm. On the lever 12 is a slide 26 guided for vertical movement on the lever and provided with a lip 27 to engage with the upper edge of the arm 23 of the locking-slide. The upper end of the lever is bored out to form a tubular chamber 28 for the reception of a push-pin 29 which is provided with a pushbutton 30 in an ornamental tip 31 secured to the upper end of the lever 12, which lever is normally thrown forward under tension of a spring 32. The latch-bolt 10 can be operated in the usual way, either by swinging the lever 12 rearward, so that it engages with the projection 13, or by turning the roll-back 14 through the handle on the outside of the door. To lock the latch-bolt, however, in its projected position, the push-pin 29 is forced downward and the slide 26, engaging with the arm 23 of the locking-slide, forces that locking-slide downward into the path of the roll-back 14, so that, when the locking-slide is depressed, the latch-bolt cannot be moved from the outside. The locking-slide, however, can be withdrawn by the rearward movement of the lever, whch causes the stud 25 to engage with the cam-edge 24, and thus raises it, and in this raising, the slide-arm 23, engaging with the lower end of the lever-slide 26, raises that slide, and hence again projects the pushbutton 30 above the upper end of the lever-tip, in position for again depressing locking-slide when so desired.

A suitable spring, such as 33, bears against one surface of the slide 17 for retaining the same in locking or unlocking position. This spring may conveniently be positioned, as indicated in Fig. 2, between the guide 19 and the portion of the locking-slide embraced by the guide.

The locking-slide may also be depressed from the outside by turning the key-spindle 22, causing the cam 21 to engage with the cam-projection 20, and thus depressing the locking-slide into the path of the roll-back 14.

I thus provide a latch for vehicle doors with means operated by a pushbutton in the lever to project the sliding block into the path of the roll-back, so as to prevent the movement of that roll-back from the outside of the door, and by the usual movement of the lever in withdrawing the latch-bolt, the push-pin is re-set into operative position.

I claim:

1. In a latch, the combination with a latch-bolt provided at its rear and near its forward end with projections, of a swinging lever engaging with the rear projection, a handle-operated roll-back adapted to engage with the forward projection, a locking-slide arranged above the roll-back in the path thereof, and a push-button mounted in the lever and adapted to depress said locking-slide into the path of the roll-back.

2. A latch, comprising a latch-bolt, and formed at its rear with an upward projection and near its forward end with an upward projection, a handle-operated roll-back adapted to engage the forward projection for retracting the bolt, a pivotally-mounted lever adapted to engage with the rear projection of the latch-bolt for retracting the same, said lever provided with a stud, a slide mounted on said lever, a push-pin mounted in the upper end of said lever and adapted to engage with said slide, whereby the slide may be depressed, said slide formed at its lower end with a lip, a vertically-movable slide mounted in the plane of the roll-back and formed with a rearwardly-extending arm passing between the stud on the lever and the lip on the lever-slide, said arm formed with a cam-surface to co-act with said stud.

3. A latch, comprising a latch-bolt, and formed at its rear with an upward projection and near its forward end with an upward projection, a handle-operated roll-back adapted to engage the forward projection for retracting the bolt, a pivotally-mounted lever adapted to engage with the rear projection of the latch-bolt for retracting the same, said lever provided with a stud, a slide mounted on said lever, a push-pin mounted in the upper end of said lever and adapted to engage with said slide, whereby the slide may be depressed, said slide formed at its lower end with a lip, a vertically-movable slide mounted in the plane of the roll-back and formed with a rearwardly-extending arm passing between the stud on the lever and the lip on the lever-slide, said arm formed with a cam-surface to co-act with said stud, said slide formed in its forward edge with a cam-surface, and a key-operated cam adapted to co-act therewith for depressing the said locking-slide.

4. A latch for vehicle doors comprising a case-plate, a latch-bolt, a pivoted lever operable for retracting the latch-bolt from the inside of the door, said latch-bolt having a forward projection, a roll-back operable from the outside of the door and engageable with said forward projection for retracting the latch-bolt, a guide secured to said case-plate, a horizontally disposed, vertically movable arm having at one end a depending portion slidable in said guide, the opposite end of said arm having sliding engagement with said plate, a member operable from the inside of the door for moving said arm vertically, said depending portion comprising also a locking slide adapted to project into the path of said roll-back to prevent retraction of the latch-bolt from the outside of the door when said arm is depressed, said arm and pivoted lever having co-operating portions for raising the said arm to release said roll-back when said lever is actuated for retracting the latch-bolt.

5. A latch for vehicle doors comprising a case-plate, a lever pivoted thereto, a latch-bolt engageable with said lever to be retracted by the latter from the inside of the door, a roll-back operable from the outside of the door for retracting said latch-bolt, a vertically slidable, horizontally disposed arm disposed substantially transversely of said lever, said arm having a depending portion, a vertically movable operating member for manually depressing said arm to project said depending portion into the path of said roll back to prevent actuation of the latter from the outside of the door, and co-operating means on the adjacent portions of said arm and lever whereby movement of the latter to retract said latch-bolt will raise said arm to release said roll-back to permit operation of the latch-bolt from the outside of the door.

6. A latch for vehicle doors comprising a case-plate, a latch-bolt, an operating member for retracting the latch-bolt from the inside of the door, a roll-back operable from the outside of the door for retracting said latch-bolt, a locking slide at one side of said operating member adapted to be projected manually into the path of said roll-back to prevent normal operation of the same from the outside of the door, said locking slide being key-operable from the outside of the door for releasing said roll-back, a horizontally disposed arm extending from said locking slide transversely of said operating member to a point beyond the same and having guided engagement with said case-plate, and co-operating means on said bolt operating member and said arm for raising the latter and said locking slide to release said roll-back when said bolt operating member is operated to retract the latch-bolt.

7. A latch for vehicle doors comprising a case-plate, a lever pivoted thereto, a latch-bolt engageable with said lever to be retracted by the latter from the inside of the door, a roll-back operable from the outside of the door for retracting said latch-bolt, a guide on said case-plate, a locking slide having a portion slidably engaged by said guide and permitting the same to be raised and lowered from and into the path of said roll-

173 back, a spring for releasably holding said locking slide in either of said positions, said locking slide when in lower position serving to prevent operation of said roll back for retracting said latch-bolt, a horizontally disposed arm extending from said locking slide transversely of said lever, and having guided engagement with said case-plate, co-operating means on said lever and arm for vertically moving said arm and locking slide from lower to upper positions when said lever is operated to retract the latch-bolt, and a manually operable member for depressing said arm and locking slide into lower position for locking said roll-back.

8. A latch for vehicle doors comprising a case-plate, a lever pivoted thereto, a latch-bolt engageable with said lever to be retracted by the latter from the inside of the door, a roll-back operable from the outside of the door for retracting said latch-bolt, a guide on said case-plate, a locking slide having a portion slidably engaged by said guide and permitting the same to be raised and lowered from and into the path of said roll-back, a spring for releasably holding said locking slide in either of said positions, said locking slide when in lower position serving to prevent operation of said roll back for retracting said latch-bolt, a horizontally disposed arm extending from said locking slide transversely of said lever, and having guided engagement with said case-plate, co-operating means on said lever and arm for vertically moving said arm and locking slide from lower to upper positions when said lever is operated to retract the latch bolt, and a manually operable member for depressing said arm and locking slide into lower position for locking said roll-back, said co-operating means comprising a cam surface on said arm and a stud on said lever.

9. In a latch, the combination of a case-plate, a latch-bolt slidable thereon, an operating member for retracting the latch-bolt from the inside of the door, a handle operated roll-back for retracting the latch-bolt from the outside of the door, a vertically movable locking slide arranged above said roll-back, a push button for moving said slide into the path of said roll-back for preventing the retraction of said latch-bolt from the outside of the door, an arm extending laterally from said locking slide transversely of said operating member and having sliding engagement with said case-plate, and co-operating members on said arm and operating member whereby said locking-slide is raised out of the path of said roll back when said operating member is actuated to retract the latch-bolt.

10. In a vehicle door latch, the combination with a supporting plate, of a latch-bolt provided at its rear and near its forward ends with projections, an operating member engaging the rear projection for retracting the latch-bolt from the inside of the door, a handle operated roll-back adapted to engage with the forward projection for retracting the latch-bolt from the outside of the door, a movable locking-member arranged above the roll-back extending rearwardly past said operating member to an opening in said supporting plate and having a pin passing through said opening with an enlarged head to hold the rear end of said locking member to said plate, and hand actuated means operatively associated with said locking-member for depressing the latter into the path of said roll-back to prevent operation thereof by said handle, from the outside of the door.

11. In a latch for automobile doors, a vertical supporting plate, a horizontally movable bolt, means on said plate supporting said bolt and permitting it to slide back and forth, a lever pivoted to said plate near the bottom thereof in close proximity thereto and passing between said bolt and said plate, a projection on said bolt offset therefrom and in the plane of said lever to be engaged thereby to provide means for withdrawing said bolt from inside the door, a horizontal shaft passing through said plate at right angles to the plane thereof having a roll-back inside said plate to engage said bolt and a handle outside to provide a second means for withdrawing said bolt, a substantially horizontally arranged locking member supported by said plate at opposite ends in close proximity thereto but spaced therefrom at an intermediate portion to provide a clearance within which said lever swings back and forth, one end of said locking member having a lower position in which it obstructs said roll-back to prevent opening the door from the outside, and an upper position in which said obstruction is removed, a substantially vertically movable member actuated by hand to lower said end and a projection on said lever engaging an under surface on said intermediate portion to raise said end when said lever is swung about its pivot in a direction to withdraw said bolt.

12. In a vehicle door latch, a vertical case-plate, a substantially horizontal latch-bolt slidable thereon, a substantially vertical lever pivoted to said case-plate below said latch-bolt and extending upwardly between the latter and the case-plate, and engaging part of said latch-bolt, a roll-back mounted on said case plate and also engaging part of said latch-bolt, a substantially horizontally arranged metal locking strip above said latch-bolt having its ends adjacent to said case-plate and the intermediate portion offset from said case-plate to provide a slot through which said pivoted lever passes, a sheet metal member also carried by said case-plate but spaced therefrom to form a clearance between the two, part of said locking strip, in front of said slot, being received within said clearance and arranged to slide up and down within the same, and the part of said locking strip to the rear of said slot being so secured to said case-plate as to permit the up and down movement of said front part, manually operable means for moving the forward end of said locking strip into the path of movement of said roll-back and a pin on said pivoted lever adjacent said slot arranged to engage the under surface of said locking strip for withdrawing said end from said roll-back when said lever is drawn to the rear.

In testimony whereof I have subscribed my name.

RICHARD V. KAIMER.